(12) United States Patent
Herrera et al.

(10) Patent No.: US 8,188,757 B2
(45) Date of Patent: May 29, 2012

(54) METHOD OF CONTROLLING A SHAPE MEMORY ALLOY ACTUATOR UTILIZING RESISTANCE CHANGE

(75) Inventors: Guillermo A. Herrera, Winnetka, CA (US); Geoffrey P. McKnight, Los Angeles, CA (US); Xiujie Gao, Troy, MI (US); Nancy L. Johnson, Northville, MI (US); Nilesh D. Mankame, Ann Arbor, MI (US); Alan L. Browne, Grosse Pointe, MI (US); Nicholas William Pinto, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 12/437,722

(22) Filed: May 8, 2009

(65) Prior Publication Data

US 2010/0117663 A1    May 13, 2010

Related U.S. Application Data

(60) Provisional application No. 61/051,351, filed on May 8, 2008.

(51) Int. Cl.
*G01R 27/08* (2006.01)

(52) U.S. Cl. ............................ 324/691; 324/76.11
(58) Field of Classification Search ............. 324/691, 324/76.11; 60/528; 396/502
See application file for complete search history.

(56) References Cited

U.S. PATENT DOCUMENTS

| 4,884,557 A | 12/1989 | Takehana et al. |
| 2008/0247748 A1* | 10/2008 | Tanimura et al. ......... 396/502 |
| 2009/0007561 A1* | 1/2009 | Matsuki ..................... 60/528 |

FOREIGN PATENT DOCUMENTS

| JP | 2006-329146 A | 12/2006 |
| JP | 2008-014268 A | 1/2008 |
| WO | 2005-075823 A1 | 8/2005 |

* cited by examiner

*Primary Examiner* — Vincent Q Nguyen

(57) ABSTRACT

A method of controlling a shape memory alloy actuator utilizing the change in resistance exhibited by the actuator over an actuation cycle, or a derivative thereof, to identify at least one event, such as, for example, a peak, valley, change in slope without reaching a valley, or a jump in resistance within the signal plot that corresponds to the start of actuation, end of actuation, an overload case, and the introduction of a resistive element respectively, and generating a response based upon the event.

17 Claims, 5 Drawing Sheets

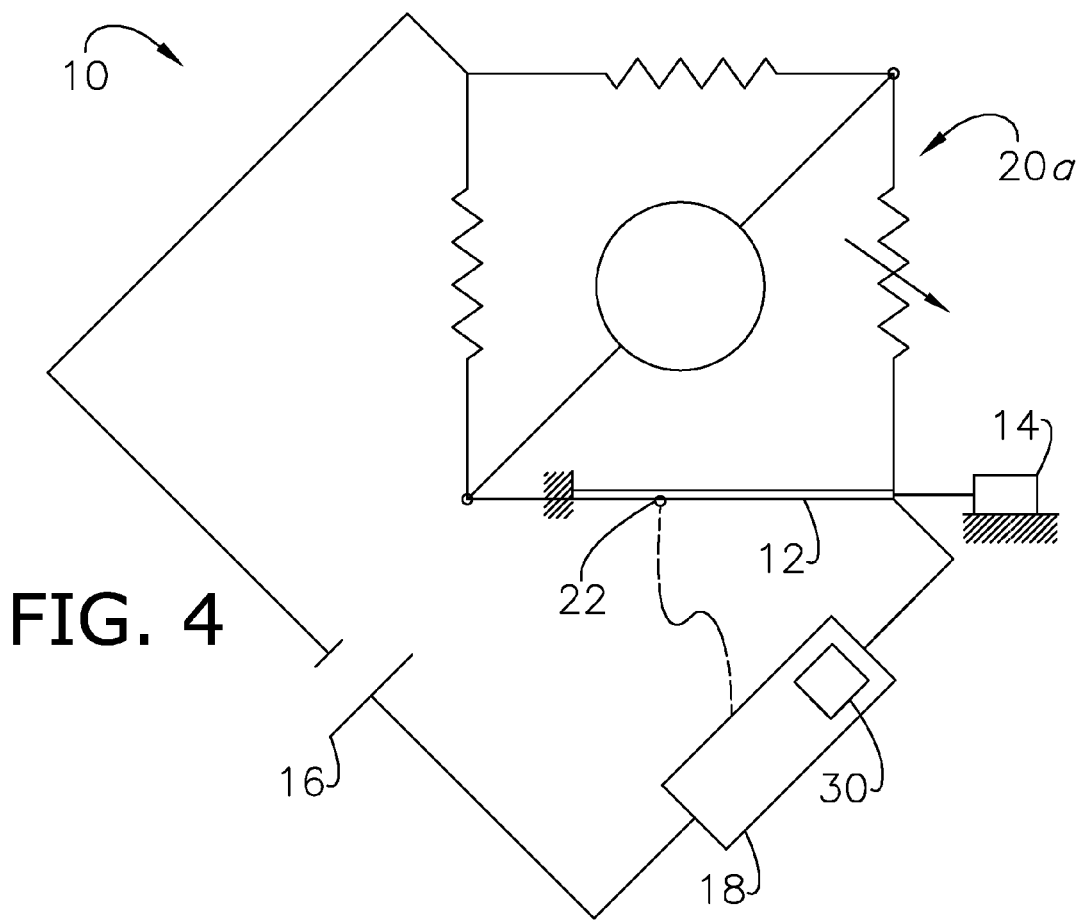
FIG. 4
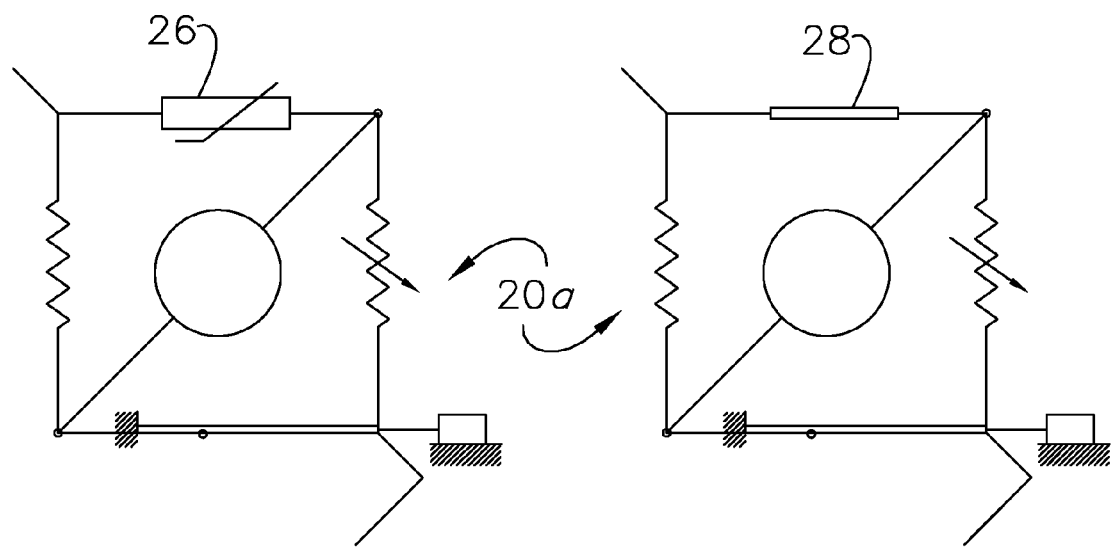
FIG. 4a
FIG. 4b

METHOD OF CONTROLLING A SHAPE MEMORY ALLOY ACTUATOR UTILIZING RESISTANCE CHANGE

RELATED APPLICATIONS

This patent application makes reference to, claims priority to, and claims benefit from U.S. Provisional Patent Application Ser. No. 61/051,351, entitled "CONTROL METHODS FOR SMA ACTUATORS," filed on May 8, 2008, the disclosure of which being incorporated by reference herein.

BACKGROUND OF THE INVENTION

1. Field of the Invention

The present disclosure generally relates to methods of controlling SMA actuators, and more particularly, to a method of controlling an SMA actuator utilizing resistance change (i.e., the change in resistance inherent to the actuator over an actuation cycle).

2. Discussion of Prior Art

Shape memory alloy (SMA) actuators, in the Martensitic state, are activated by heating the SMA material to a temperature that is above a prescribed value. This causes the material to undergo phase transformation from a Martensitic to an Austenitic state, wherein it contracts and in the process is used to do work. SMA wires, for example, are resistively heated by applying an electrical current there through. Concerns with this approach include overheating, i.e., applying an excess of heat energy above what is required to actuate the wire, and overloading, i.e., applying a stress load, for example, by blocking the work, that is greater than the recommended tensile load of the SMA wire. More specifically, it is appreciated that overheating and overloading can cause longer cooling times, reduced system response bandwidth, and in some cases damage to the wire. It is therefore desirable to have an effective and robust means of controlling wire actuation to prevent overheating and overloading, and to provide consistent output and streamlined actuation over the life of the actuator.

Traditionally, various external sensors and/or mechanical devices, such as temperature and position sensors, have been used to alleviate concerns relating to overheating, overloading, and variation/degradation in output. However, these provisions add to the complexity, costs, and packaging requirements of conventional actuators. Closed-loop controls have been developed that monitor absolute actuator resistance as feedback, however, these methods often present inaccuracy concerns due to susceptibility to noise, and variations in ambient conditions.

BRIEF SUMMARY OF THE INVENTION

The present invention addresses these concerns by providing novel methods of controlling a shape memory alloy actuator based on the inherent change in resistance exhibited by the actuator over a thermal activation cycle. The invention is useful, among other things, for preventing overheating and overloading during a cycle, for providing accurate feedback to better control the cycle, and for providing consistent output over multiple cycles. As such, the invention is useful for protecting the integrity of the SMA actuator, and the device or machine driven thereby, over the life of the actuator.

The invention generally concerns a method of autonomously controlling a shape memory alloy actuator. The method includes applying an activation signal to the actuator, monitoring the electrical resistivity of the actuator over time, so as to develop a return signal based on electrical resistance change, determining a first event within the return signal, based on a predetermined event definition, and generating a response, when the event is determined. As such, the invention further presents methods of more accurately monitoring resistance over time.

Various embodiments of the inventive method are presented including those using first and multiple-order derivatives of the resistance signal to improve accuracy and dependability when identifying events, those that consider external input or sensory feedback to modify the algorithm and/or supplement the signal, and those using event identification to enter a record, initiate or look for another event, start a predetermined period, or modulate the signal so as to maintain the actuator position or strain.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 4 is a diagram of the system shown in FIG. 1, wherein the device presents a Wheatstone bridge set-up, in accordance with a preferred embodiment of the invention;

FIG. 4a is a partial diagram of the system shown in FIG. 4, wherein a thermistor is functionally disposed within one of the arms of the bridge, in accordance with a preferred embodiment of the invention;

FIG. 4b is a partial diagram of the system shown in FIG. 4, wherein an SMA section is disposed within one of the arms of the bridge, in accordance with a preferred embodiment of the invention.

DETAILED DESCRIPTION OF THE INVENTION

The following description of the preferred embodiments is merely exemplary in nature and is in no way intended to limit the invention, its application, or uses. As described and illustrated herein, a novel control system 10 is adapted for use with a shape memory alloy (SMA) actuator (e.g., wire) 12; however, it is certainly within the ambit of the invention to utilize the benefits of the system 10 with other thermally or electrically activated active materials that generate a change in resistance during actuation.

Figure 1:
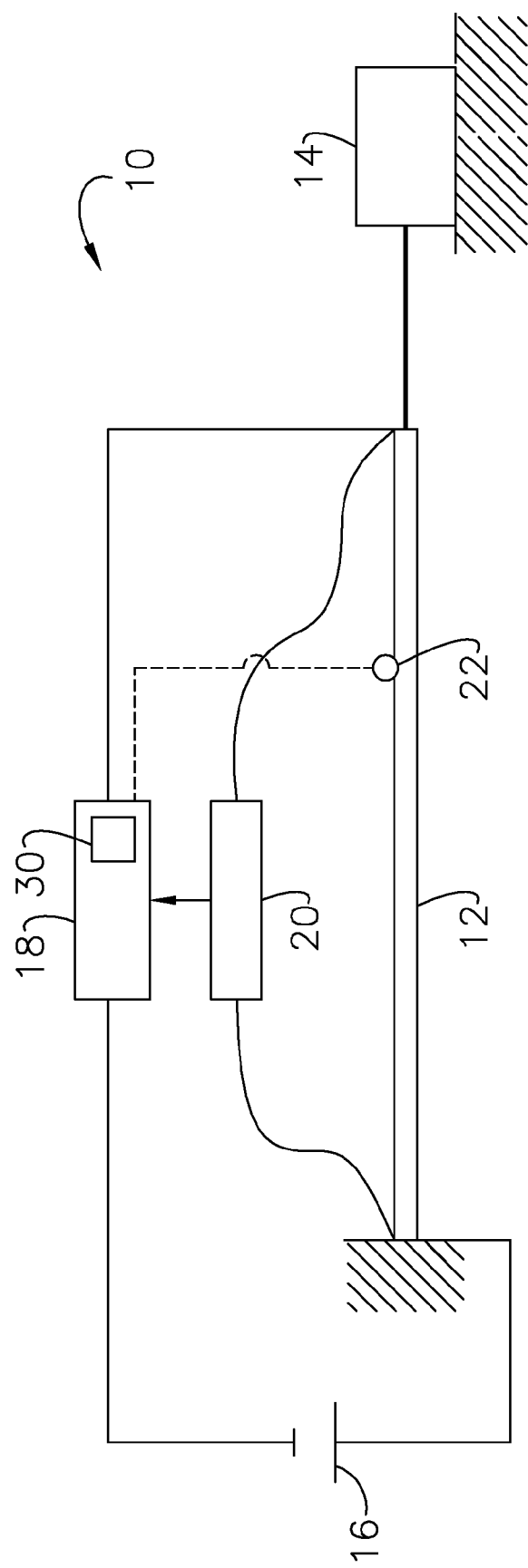
FIG. 1 is a diagram of a control system forming a circuit and including an electric power source, shape memory alloy actuator wire drivenly coupled to a load, a controller intermediate the source and actuator and operatively coupled to the actuator, and a monitoring device communicatively coupled to the controller, so as to provide feedback thereto, in accordance with a preferred embodiment of the invention.
Figure 2:
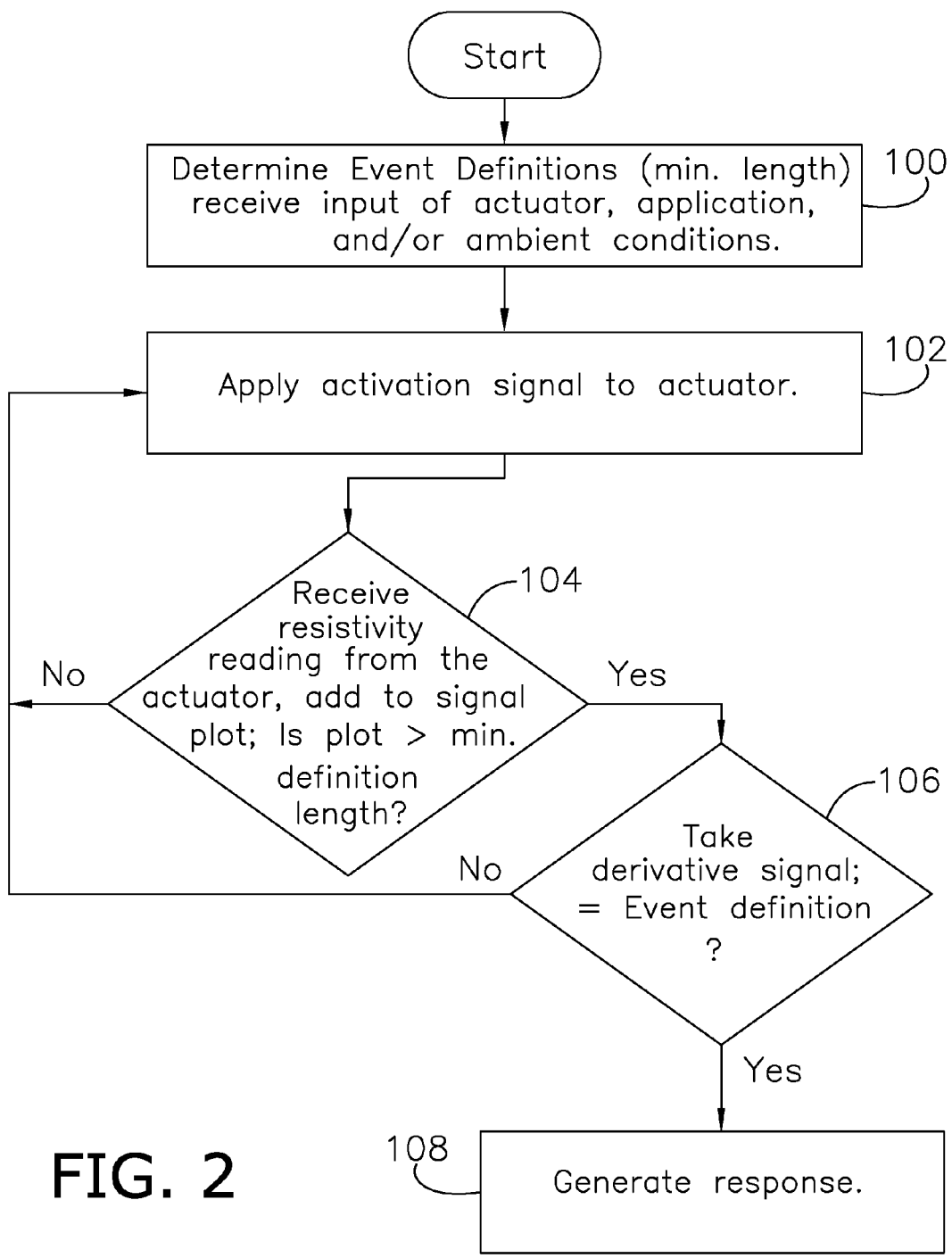
FIG. 2 is a flow diagram of a method of controlling an actuation cycle of a shape memory alloy actuator, in accordance with a preferred embodiment of the invention.

In the exemplary set-up shown in FIG. 1, the system 10 includes an actuator wire 12 that is drivenly coupled to a load 14, so as to perform useful mechanical work, a power source 16 operable to selectively deliver an activation signal to the wire 12, a controller 18 operatively coupled to the source 16 and actuator wire 12, and a monitoring device 20 communicatively coupled to the controller 18. Various embodiments of the system 10, including differing devices 20 for more accurately measuring resistance change within the wire 12, and algorithms for execution by the controller 18 are further described below and illustrated in FIGS. 1-5. As used herein the term "wire" is non-limiting, and shall include other similar geometric configurations presenting tensile load strength/strain capabilities, such as cables, bundles, braids, ropes, strips, chains, and other elements.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system 10 with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Returning to the present invention, the controller 18 is programmably configured to autonomously control the shape memory alloy actuator 12 (FIG. 2) based on resistance change during actuation. In a preferred mode of operation, system-specific event definitions to be monitored are determined by the controller 18, at a first step 100. For example, pre-existing definitions may be modified based upon the physical and inherent characteristics of the wire 12 (e.g., length, composition, diameter, pre-strain, etc.), the type of application to be performed (e.g., critical, moderate, etc.), ambient condition(s), and/or historical data, such as whether another event has previously been recorded. Accordingly, it is appreciated that the system 10 may further include at least one sensor 22, such as a thermal bead, communicatively coupled, so as to deliver input, to the controller 18 (FIG. 1). In an automotive setting, for example, the input may be the external temperature, internal cabin temperature, the actuator wire temperature or strain, the vehicle speed or acceleration, a user input, the battery voltage, occupant sensory data, door sensory data, or engine health sensory data.

Figure 3:
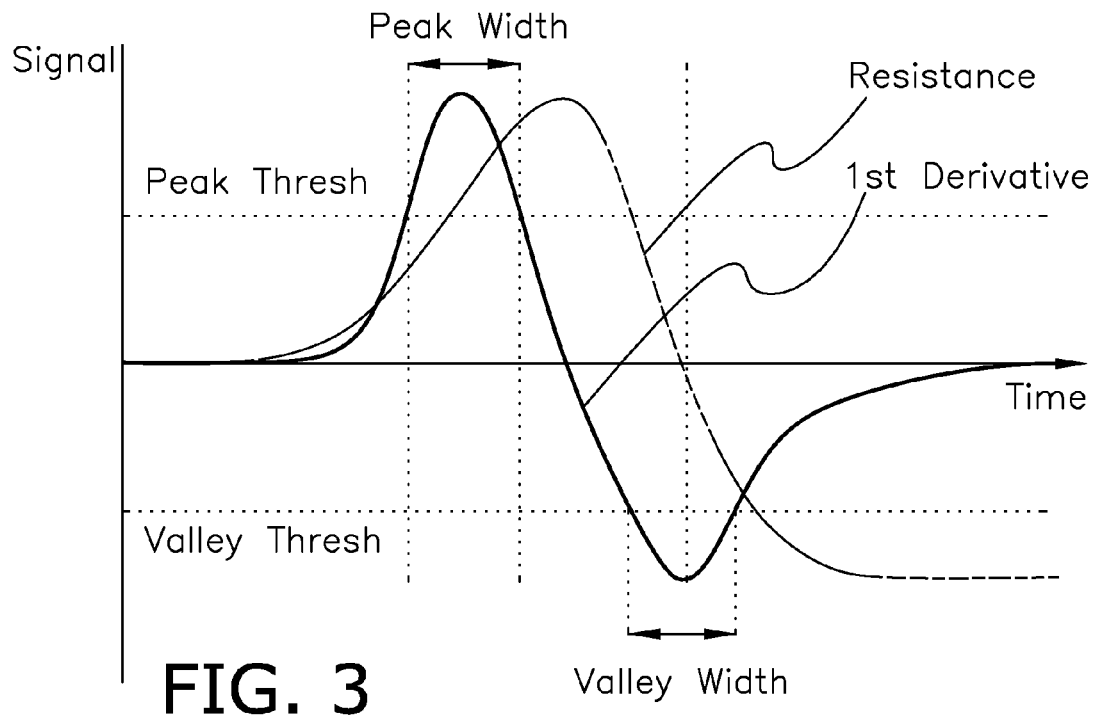
FIG. 3 is a graph of a resistance change signal and the first-order derivative thereof, particularly illustrating peak and valley events during normal actuation.
Figure 3A:
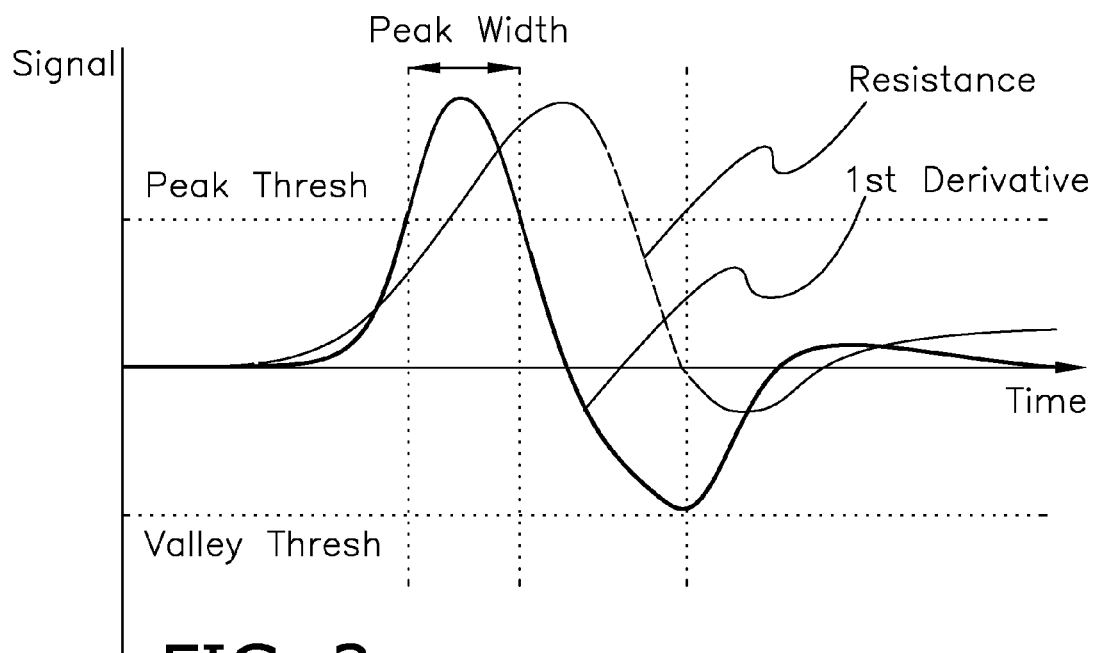
FIG. 3a is a graph of a resistance change signal and the first-order derivative thereof, particularly illustrating peak and valley events during overloading.

The event, for example, may be defined as a peak, valley, change in slope without reaching a valley, or a jump in resistance within the signal plot that corresponds to the start of actuation, end of actuation, an overload case, and the introduction of a resistive element respectively. In an aspect of the invention, events are more accurately determined from the first or multiple-order derivative of the resistance change signal (FIGS. 3 and 3a).

Once the definitions are determined, the controller 18 proceeds to step 102 where it applies an activation signal to the actuator 12. At a step 104, the monitoring device 20 receives a resistivity reading representative of the actual resistance of the wire 12. Steps 102 and 104 are then performed continuously or incrementally over time (or until a time-out period is reached), so as to develop a return signal based on electrical resistance change. More preferably, where the event definitions are based thereupon, the resistance change signal is derived at least once to determine the first and more preferably a multiple derivative of the signal. When a minimum number of readings are taken, based on the length or period of the shortest monitored event, the method continues to step 106 where the derivative is compared to the event definitions, so as to determine a first event within the return signal.

At step 106, historical data may be considered to modify the comparison procedure. For example, it may be desirable to consider the age of the device 20 or other characteristic that may affect the signal over time, even though the definition remains constant. If no event is determined the method returns to step 102, where monitoring continues. If an event is determined, a response is generated (i.e., performed, etc.) at step 108. The response, for example, may be generating an indicator that alerts of the event; as such, the system may further include communicating means, such as a visual/audio display.

Alternatively, the response may consist of causing a record of the event to me maintained either temporarily for further use in the on-going actuation cycle, or permanently to keep track of actuator performance, life expectancy, etc. For example, once a first event is recorded, the method may include further monitoring for a second event correlative to the first, reporting the first event or derivative information based thereupon to a communicatively coupled node, entity, or module. In another example, the response may be to determine an actuation influencing condition, such as the ambient temperature, based on a characteristic of the first event.

In yet another alternative, the response may be to modify the activation signal, so as to vary and/or turn on or off the signal. In this regard, the response may be to discontinue the signal once an overheating or overloading event is detected; or, to modulate (e.g., turned on and off in pulse fashion) the signal, so as to maintain the current strain or position of the actuator wire 12. Once a peak event is determined, the response may be to analyze the historic signal to determine a "heating period" as defined by the start of application of the activation signal and the onset of the detected peak event; the controller 18 may be configured to determine and set a "transformation period" for applying the activation signal, based on the heating period, and then terminate the activation signal after the transformation period has expired.

Finally, it is appreciated that the external input may be combined with the signal analysis to trigger a response; for example, where the input is the actuator temperature or strain, the event may be the exceedance of a threshold value, wherein the value is a function of the resistivity and temperature or strain, and the response is terminating the activation signal, so as to provide overheating and/or overload protection.

As previously mentioned, the invention includes novel means and methods of more accurately determining (e.g., detecting) the resistance of an SMA wire 12, which is essential for providing consistent and accurate control. A first example of the device 20 is a Wheatstone bridge set-up 20a presenting a plurality of arms 24, wherein the bridge 20 is operable to detect a non-null value (FIG. 4). Here, at least one thermistor 26, hotwire, or electrostrictive material (e.g., piezoelectric, electroactive polymer, etc.) is preferably disposed within at least one of the arms 24, so as to provide temperature and/or load compensation (FIG. 4a).

Alternatively, a SMA section 28 presenting a section length less than the actuator length may be disposed within at least one of the arms 24 (FIG. 4b). The resistance of the section 28 is measured directly, and the actuator length is divided by the section length to determine the current within the bridge. A look-up table 30 can then be searched to find the resistance, and provide temperature compensation based on feedback from the section 28. The bridge 20a otherwise functions as is known in the art to equate the resistance within the mirrored branches, so that the current across the bridge is zero. By knowing the resistance of three of the arms, the fourth unknown arm (actuator wire 12) may be calculated accurately. It is appreciated that where driving the SMA with a pulse-width modulation (PWM) signal, the bridge may be measured during the power off (lows) portion of the PWM signal, and the changes in resistance recorded during the actuation.

Figure 5:
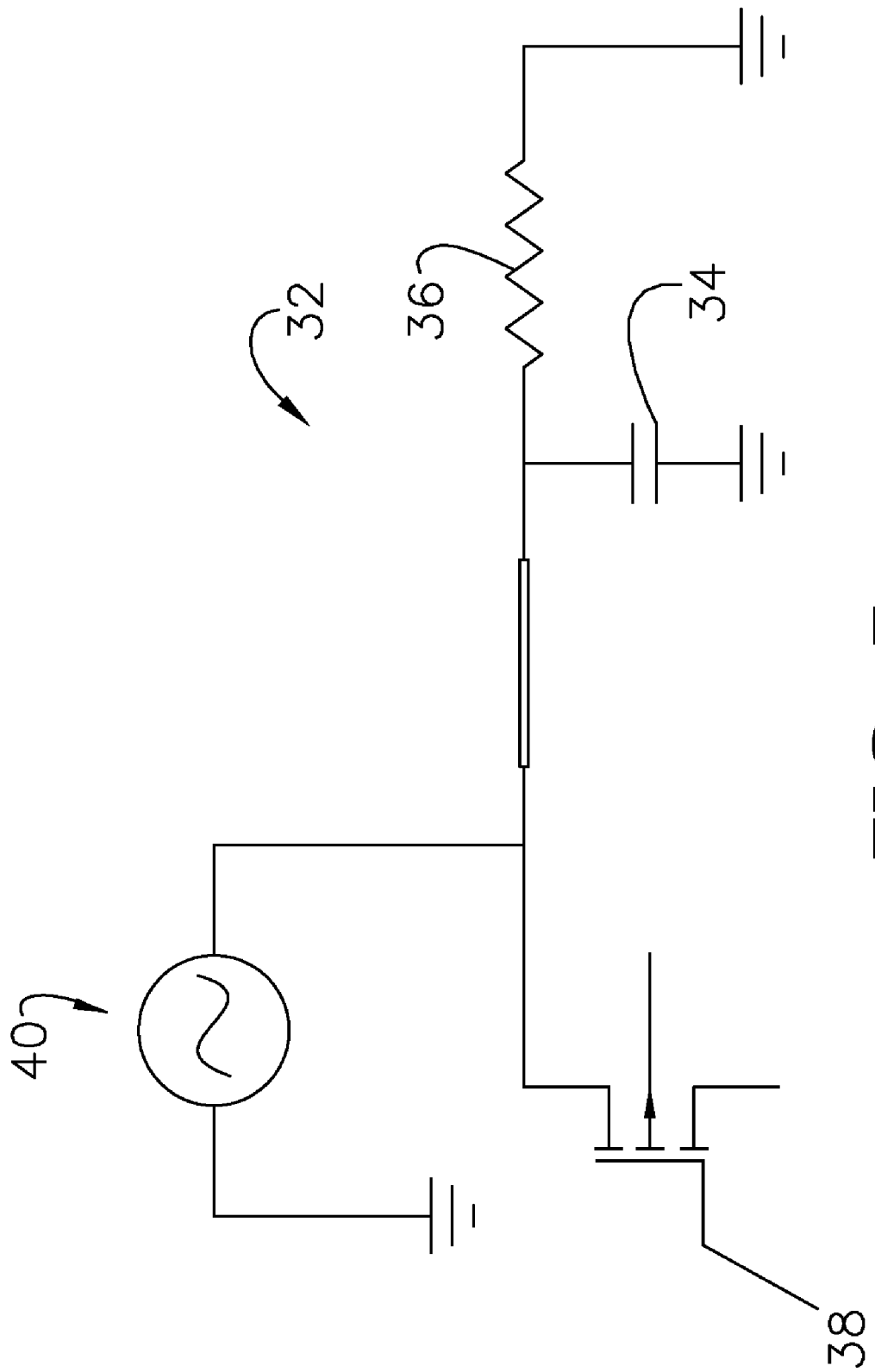
FIG. 5 is a diagram of the system shown in FIG. 1, wherein the device presents a resistor-capacitor circuit, in accordance with a preferred embodiment of the invention.

In a second example, the actuator 12 is connected to and the device 20 presents a resistor-capacity (RC) circuit 32 configured to monitor the resistivity by finding a cutoff frequency of the circuit 32 and searching a look-up table 30, so as to provide temperature compensation. As shown in FIG. 5, the RC circuit 32 may include a capacitor 34 and a current limiting resistor 36 connected in series to the actuator 12. The actuator 12, which has a known starting resistance, is connected to an SMA driver circuit 38, and a frequency generator 40 completes the circuit 32 and is operative to sweep a desired frequency range. That is to say, just prior to firing the actuator circuit 38, the generator 40 runs a frequency sweep through the wire 12 to find the cutoff frequency of the low pass filter; since $F_{cutoff} = R \times C$, and the value of C is known, then the R value of the SMA actuator just prior to activation can be determined. The ambient temperature may then be retrieved from a look up table to give a compensated output to a known resistance.

Alternatively, an RC circuit may be used, wherein a capacitor 34 is connected in parallel to the actuator 12 and the resistance monitored by establishing a predetermined voltage and measuring the charge/discharge time of the capacitor 34.

Lastly, in a third example, the system 10 may superimpose an AC signal atop the regular activation signal. The controller 18 monitors changes in the AC signal that result from changes in the resistance in the wire 12. The changes in the AC signal can be changes in amplitude or frequency that are used to define events.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A method of autonomously controlling a shape memory alloy actuator presenting an actuator length, said method comprising:
   a. applying an activation signal to the actuator;
   b. monitoring the electrical resistivity of the actuator over time, so as to develop a return signal based on electrical resistance change, wherein step b) further includes the steps of monitoring the resistivity using a Wheatstone bridge set-up presenting a plurality of arms, so as to detect a non-null value, wherein at least one thermistor, hotwire, or electrostrictive element is functionally disposed within at least one of the arms, so as to provide temperature or load compensation, respectively;
   c. determining a first event within the return signal, based on a predetermined event definition; and
   d. generating a response, when the event is determined.

2. The method as claimed in claim 1, wherein steps b) and c) further include the steps of determining the first derivative of the return signal, and determining an event based on the derivative.

3. The method as claimed in claim 2, wherein steps b) and c) further include the steps of determining a multiple derivative of the return signal, and determining an event based on the multiple derivative.

4. The method as claimed in claim 1, wherein step c) further includes the step of comparing the return signal to historical data to determine an event.

5. The method as claimed in claim 1, wherein a shape memory alloy section presenting a section length less than the actuator length is disposed within at least one of the arms, and step b) further includes the step of searching a look-up table to provide temperature compensation.

6. The method as claimed in claim 1, wherein step b) further includes monitoring a superimposed AC signal.

7. The method as claimed in claim 1, wherein the response is selected from the group consisting essentially of generating an indicator alerting of the event, maintaining a record of the event, and modifying the activation signal.

8. The method as claimed in claim 1, wherein the event is a peak, valley, change in slope without reaching a valley, or a jump in resistance corresponding to the start of actuation, end of actuation, an overload case, and the introduction of a resistive element, respectively.

9. The method as claimed in claim 1, wherein the response includes maintaining a record of the first event, and further includes monitoring for a second event correlative to the first, reporting the first event or derivative information based thereupon, or determining an ambient condition based on a characteristic of the first event.

10. The method as claimed in claim 9, wherein the response is modulating the activation signal to maintain the current strain in the actuator.

11. The method as claimed in claim 1, wherein step c) further includes receiving an external input and modifying the event definition based on the input.

12. The method as claimed in claim 11, wherein the input is selected from the group consisting essentially of an external temperature, internal temperature, the actuator temperature, actuator strain, a user input, a vehicle speed or acceleration, a battery voltage, occupant sensory data, door sensory data, and engine health sensory data.

13. The method as claimed in claim 12, wherein the input is the actuator temperature, the event is the exceedance of a threshold value, the value is a function of the resistivity and temperature, and the response is terminating the activation signal, so as to provide overheating protection, when the event is determined.

14. The method as claimed in claim 12, wherein the input is the actuator strain, the event is the exceedance of a threshold value, the value is a function of the resistivity and strain, and the response is terminating the activation signal, so as to provide overload protection, when the event is determined.

15. The method as claimed in claim 1, wherein steps c) and d) further include the steps of analyzing the return signal so as to determine a heating period between the application of the activation signal and onset of a peak event, setting a transformation period based on the heating period, and terminating the activation signal after the transformation period has expired.

16. A method of autonomously controlling a shape memory alloy actuator presenting an actuator length, said method comprising:
    a. applying an activation signal to the actuator;
    b. monitoring the electrical resistivity of the actuator over time, so as to develop a return signal based on electrical resistance change, wherein step b) further includes connecting the actuator to an RC circuit and monitoring the resistivity by finding a cutoff frequency of the circuit and searching a look-up table, so as to provide temperature compensation;
    c. determining a first event within the return signal, based on a predetermined event definition; and
    d. generating a response, when the event is determined.

17. A method of autonomously controlling a shape memory alloy actuator presenting an actuator length, said method comprising:
    a. applying an activation signal to the actuator;
    b. monitoring the electrical resistivity of the actuator over time, so as to develop a return signal based on electrical resistance change, wherein step b) further includes connecting the actuator to an RC circuit including a capacitor connected parallel to the actuator, and monitoring the resistivity by establishing a predetermined voltage and measuring the charge/discharge time of the capacitor;
    c. determining a first event within the return signal, based on a predetermined event definition; and
    d. generating a response, when the event is determined.

* * * * *